United States Patent
Mezzanotte et al.

[11] 3,736,973
[45] June 5, 1973

[54] RADIAL TIRES HAVING A SIDEWALL-STIFFENING STRUCTURE

[75] Inventors: Mario Mezzanotte, Milan; Ferdinando Carretta, Monza; Gianni Turchetti, Bresso, all of Italy

[73] Assignee: Industries Pirelli S.p.A., Milan, Italy

[22] Filed: Mar. 6, 1972

[21] Appl. No.: 231,953

[30] Foreign Application Priority Data
Mar. 17, 1971 Italy..................................21876 A/71

[52] U.S. Cl.................152/354, 152/356, 152/362 R
[51] Int. Cl................................................B60c 15/06
[58] Field of Search..................152/354, 356, 362 R, 152/362 CS

[56] References Cited
UNITED STATES PATENTS
3,557,860   4/1969   Maiocchi..........................152/362 R
3,612,137   10/1971   Guyot..............................152/362 R FOREIGN PATENTS OR APPLICATIONS
995,645   6/1965   Great Britain....................152/362 R Primary Examiner—Gerald M. Forlenza
Assistant Examiner—Robert Saifer
Attorney—Stevens, Davis, Miller & Mosher

[57] ABSTRACT

A pneumatic tire is disclosed having improved sidewall flexibility by using a reinforcing structure between the bead zone comprised of at least two strips of textile cord sandwiching a strip of metal cord. The angle formed between the textile cord strips and the circumferential line of the tire is 15° to 40° and the textile cords are parallel to one another. The metal cords are also parallel to one another. The angle formed between the metal cord strip and the tire's circumferential line is from 2° to 10° greater than the angle between the textile cords and the circumferential line. The angle of inclination of the metal cord strip is in a direction opposite to the textile cord strips.

8 Claims, 4 Drawing Figures

Patented June 5, 1973 3,736,973

RADIAL TIRES HAVING A SIDEWALL-STIFFENING STRUCTURE

The present invention relates to pneumatic tires for vehicle wheels. In particular it relates to pneumatic tires provided with a radial carcass, namely a carcass whose cords lie in meridian planes or form small angles with said planes.

It is known that pneumatic tires provided with a radial carcass possess remarkable advantages over those having a crossed ply carcass. It is additionally known that they have a flexibility considerably greater than that of conventional tires in the sidewall zone.

This greater sidewall flexibility confers a high comfort degree advantage to the radial tire which cannot be achieved in any other way, but in particular service conditions, it can also cause a certain instability in the tire trajectory, depending upon the intensity of the lateral thrusts to which the tire is subjected. Thus, the driver is compelled to carry out continuous slight actions on the steering wheel in order to correct the instability in the tire trajectory.

Obviously, the instability is more noticeable as the vehicle speed increases, since the above indicated corrective actions become more frequent at high speed conditions.

In order to eliminate this drawback, various solutions have been found, intended in general to increase the rigidity of the lower zone of the sidewalls, and call for the insertion of reinforcements of various kinds, e.g., structural shapes made of high hardness rubber, or by the adoption of additional strips of cords which cross with one another and the carcass cords. This is varied according to the degree of stiffness which one wishes to impart to said zone.

In the present description the expression "lower zone of the sidewall" means the zone extending between the point of maximum section of the tire (which corresponds approximately to one-half of its section height) and the bead of the tire itself.

In fact, the insertion of structural shapes of high hardness rubber can be appropriate when one wishes to impart a limited increase of the degree of transversal rigidity of the sidewalls to the radial tire, without causing a concomitant excessive loss of flexibility in radial direction and therefore a reduction in comfort.

When the tire requires a strong increase in the degree of transversal rigidity of the sidewalls, it is preferable to use additional strips of crossed cords.

This latter solution, although solving the problem of instability of the tire trajectory at high speed, may cause other disadvantages.

In fact, the presence of additional strips of cords crossing with one another and the carcass cords limited to the lower zone of the sidewalls, gives rise to a great difference in the rigidity between said zone and the upper zone of the sidewalls; such a difference in rigidity, under the action of the lateral thrusts suffered by the tire in service, causes shearing stresses, which tend to concentrate at the radially outer ends of said strips. Possible detachments between the strips and the carcass or even ruptures of the cords of the latter are the consequences of such a structure.

In order to obviate such disadvantages, it has been proposed to use strips made of "elastic" cords, namely cords having a low modulus of elasticity, which cross with one another and the carcass cords. This is done in order to allow mutual local deformations between the cords of the lower zone of the sidewall in order to reduce the above indicated concentration of the shearing stresses; it is however evident that this result is obtained at the price of a corresponding reduction in the transversal rigidity of the sidewalls and consequently in the stability of the tire in service.

The present invention aims to provide a pneumatic tire for vehicle wheels which comprises a carcass constituted by textile cords lying in radial planes or forming small angles with said planes, said cords extending from one bead to the other and being turned up about the bead cores contained in the beads, from the inner side towards the outer side, each bead comprising a filler of hard rubber arranged on the bead core and extending towards the lower zone of the sidewall, the bead zone and the lower sidewall zone comprising a reinforcing structure disposed in an axially outer position with respect to the carcass, characterized in that said reinforcing structure comprises at least two strips of textile cords, between which is sandwiched a strip of metal cords, said textile cords being parallel to one another and being inclined in a single direction with respect to the circumferential lines of the tire, the metal cords being parallel to one another and being inclined in a direction opposite to that of the textile cords, the angle formed by the textile cords with the circumferential lines of the tire ranging between 15° and 40°, the angle formed by the metal cords with said circumferential lines being greater than the angle between the textile cords and the circumferential lines, and the difference between the values of said angles ranging between 2° and 10°.

In the present description, thee expression "textile cords" is used in the meaning commonly attributed to it in the tire industry, which comprises, by way of example, organic textile material such as cotton and rayon, fibers from synthetic polymers such as polyamide fibers, polyester fibers and the like.

The "inner side of the bead core" is that side directed towards the tire concavity intended to accomodate the inner tube.

In the present description, the expression "high hardness rubber" means a compound having a hardness ranging between 80° and 95° Shore, while the expression "low hardness rubber" means a compound whose hardness has a value ranging between 55° and 65° Shore.

The above described reinforcing structure has proved particularly advantageous, since it confers a high transversal rigidity to radial tires, offering at the same time a very good fatigue resistance of the sidewalls.

This is probably due to the combination of the textile strips with the metal strip sandwiched between them, and in particular to the fact that the metal cords are inclined at a slightly greater angle than the textile cords; in said combination the metal cords and the textile cords seem to mutually cooperate so as to impart the desired transversal rigidity to the tire sidewall without causing ruptures due to the continuous flexions taking place in service.

In particular, as the metal cords have a modulus of elasticity higher than that of the carcass cords, they are able to afford a better resistance to a lateral stress on the tire sidewall.

On the other hand, the cords of the adjacent textile strips, which have a modulus of elasticity lower than that of the metal cords, are able to absorb the shearing strains due to the same stress. This tends to occasion relative slidings between the various elements in the lower sidewall zone.

In other words, while the strip of metal cords accomplishes the task of conferring the necessary transversal rigidity to the sidewalls of radial tires, the adjacent strips of textile cords, besides contributing to a further increase in said rigidity, prevailingly act as shock-absorbing elements, preventing dangerous concentrations of the shearing stresses and opposing a high fatigue resistance to the continuous bending stresses of the tire in service.

Moreover, the excessive reduction in comfort which could be expected owing to the presence of cords arranged along three different directions, surprisingly does not take place.

Preferably, the above described reinforcing structure extends in the lower sidewall zone as far as a height ranging between 25 and 45 percent of the height of the tire section, the strip of metal cords extending as far as a radially outermost height with respect to the strips of textile cords, for a length not exceeding 30 mm.

By means of this expedient, the radially outermost zone of the reinforcing structure does not show crossings between metal cords and textile cords of the corresponding strips; in this way it is possible to avoid a sudden variation of rigidity by passing from the lower sidewall zone concerned with said structure, to the upper sidewall zone.

According to a preferred embodiment, at least the radially outermost zone of the reinforcing structure is axially inserted between two structural shapes of hard rubber, said structural shapes extending as far as a radially outermost height with respect to said structure, for a length ranging between 3 and 30 mm. In this way a double advantage is achieved; namely, at first to further graduate the reduction of rigidity, by passing from the lower sidewall zone to the upper sidewall zone, and secondly to make all of the structural shapes of hard rubber participate in withstanding the buckling to which the outermost ends of the reinforcing structure are subjected, and to further reduce the mutual sliding between the various elements having different moduli of elasticity, thus preventing possible detachments of said elements.

Preferably, at the radially outermost zone of the reinforcing structure, between the axially innermost structural shape of hard rubber and the carcass, there is inserted a strip of low hardness rubber, whose cross section has a length ranging between 15 and 50 mm., the midline of said section being situated at the height of the radially outermost zone of said reinforcing structure.

In this way, a further advantage is obtained in that said strip of low hardness rubber is able to absorb a good part of the relative slidings between the various elements constituting the lower portion of the sidewall, thus cooperating to improve the fatigue resistance of the latter.

According to a further preferred embodiment, the reinforcing structure is axially arranged between the carcass and the filler of hard rubber situated over the bead cores. The strips of textile cords of said structure are turned up about the bead cores from the inside towards the outside and continue their travel toward the lower sidewall portion as far as a height radially comprised between the turn-ups of the carcass and the radially outermost ends of said reinforcing structure. The strip of metal cords is not turned up about said bead cores and terminates at the height of the latter.

According to a further preferred embodiment, the reinforcing structure is axially situated between the filler of hard rubber arranged over the bead cores and the turn-ups of the carcass and the strips of textile cords of said structure are turned up about the bead cores from the outside towards the inside and terminate in the bead zone. The strip of metal cords is again not turned up about said bead cores and terminates at the height of the latter.

Preferably, in the axially outermost position, provision is made for a strip of hard rubber extending from the base of the bead as far as a radially outermost height of said reinforcing strip.

The invention will now be better illustrated with reference to the attached drawings, in which, by way of example:

Figure 1:
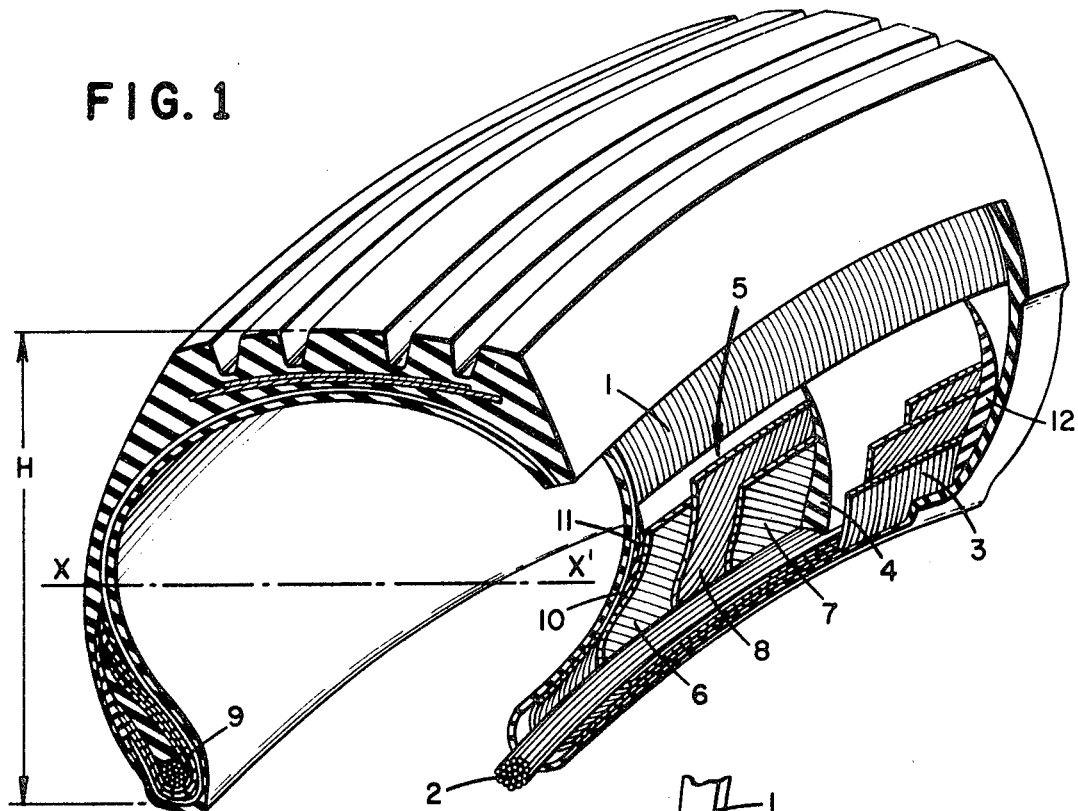
FIG. 1 is a perspective view of a radial tire according to the present invention, with parts taken away at the sidewall zone.

In the drawings, line X—X' represents the end line of the lower zone of the sidewall.

Figure 2:
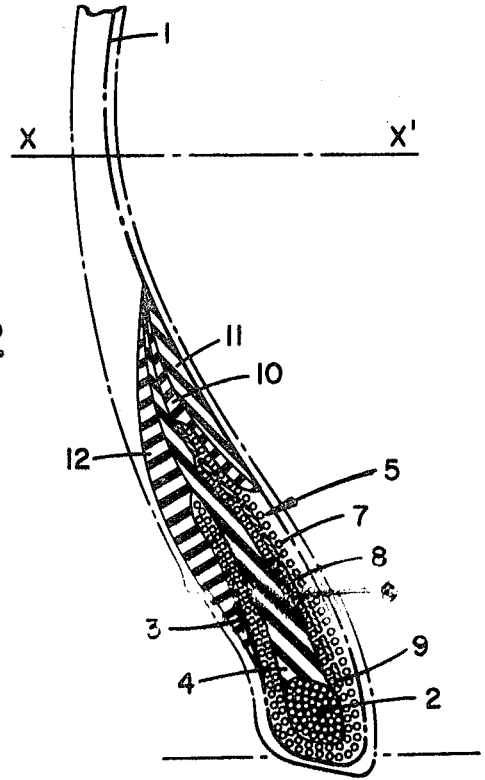
FIG. 2 represents the sidewall of the tire shown in FIG. 1 in cross section.

FIGS. 1 and 2 illustrate the sidewall of a radial tire, whose carcass 1 is constituted by a single ply of nylon cords lying in radial planes, which are turned up about the bead core 2 from the inside towards the outside; the turn-ups 3 extend as far as the bead zone.

Over the bead core 2, there is a filler 4 of a compound having a hardness of 90° Shore, which extends in the sidewall zone as far as a height equal to 45 percent of the height H of the tire section.

The thickness of the filler 4 is gradually reduced by passing from the bead to the sidewall.

A reinforcing structure 5, composed of two strips of nylon cords 6 and 7, having a strip of metal cords 8 sandwiched therebetween, is inserted between the filler 4 and the carcass 1.

The nylon cords of strips 6 and 7 are inclined in the same sense with respect to the circumferential lines of the tire parallel to the bead core 2, and form an angle of 22° with them, while the metal cords of strip 8 are inclined in a sense opposite to that of the nylon cords, so as to cross with them, and form an angle of 25° with said circumferential lines.

The metal cords of strip 8 have a 3 × 4/0.22 HE formation, namely are formed by three strands, each strand being formed by four wires, each having a diameter of 0.22 mm.; the letters HE mean "High Elongation;" the nylon cords of strips 6 and 7 and of the carcass 1 have a 1400/3 count.

At the radially innermost zone of the reinforcing structure 5, strips 6 and 7 are turned up about the bead core 2 from the inside towards the outside, and continue their travel, between the turn-up 3 and the filler 4, towards the lower sidewall zone, as far as a height equal to 25 percent of the height H of the tire section; on the contrary the radially innermost skirting 9 of the strip of metal cord 8 is not turned up about the bead core 2, but terminates at the height of said bead core.

At the radially outermost zone of the reinforcing structure 5, the strip of metal cords 8 extends in the sidewall zone as far as a height equal to 35 percent of the height H of the tire section, while strips 6 and 7 reach a radially lower height, respectively of 9 and 17 mm., with respect to that of strip 8.

Still at the radially outermost zone of the reinforcing structure 5, in a position axially comprised between said structure and the carcass 1, there is a structural shape of hard rubber 10, adjacent to structure 5, and a strip of low hardness rubber 11, in contact with the carcass 1.

The hardness of the structural shape 10 and that of the strip 11 are of 90° Shore and of 60° Shore, respectively.

The section of the rubber strip 11 of low hardness has a length of 30 mm.; said strip 11 is positioned in such a way that the midline of its section corresponds to the radially outermost height of the strip of metal cords 8.

The structural shape 10 of hard rubber has a development equal to that of strip 11, or can form a slight graduation with the latter.

At last, in an axially outer position with respect to the turn-up 3 of the carcass, there is a strip 12 of hard rubber which extends from the bead base towards the height reached by the filler 4, in order to provide the necessary graduality between the stiffness of the lower portion of the sidewall and the upper portion of the same.

Figure 3:
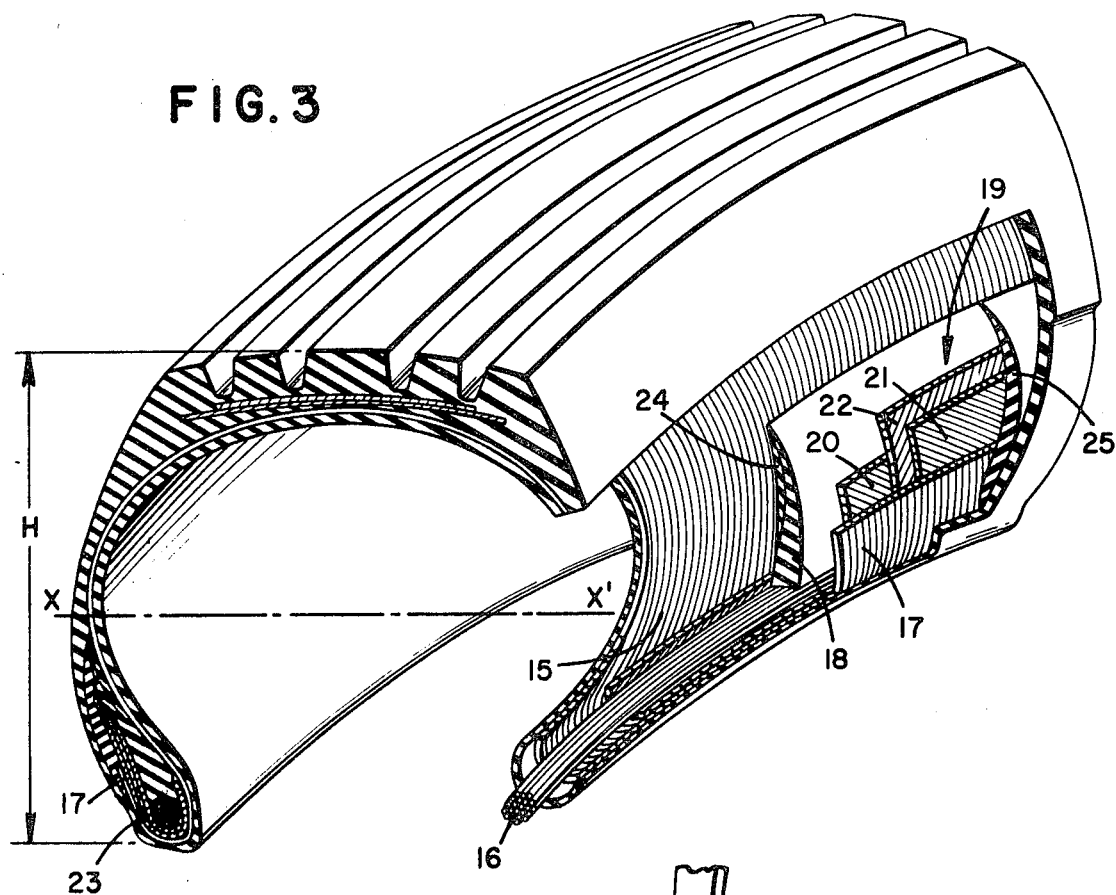
FIG. 3 represents a radial tire according to an alternative embodiment of the invention, with parts taken away at the sidewall zone in perspective.
Figure 4:
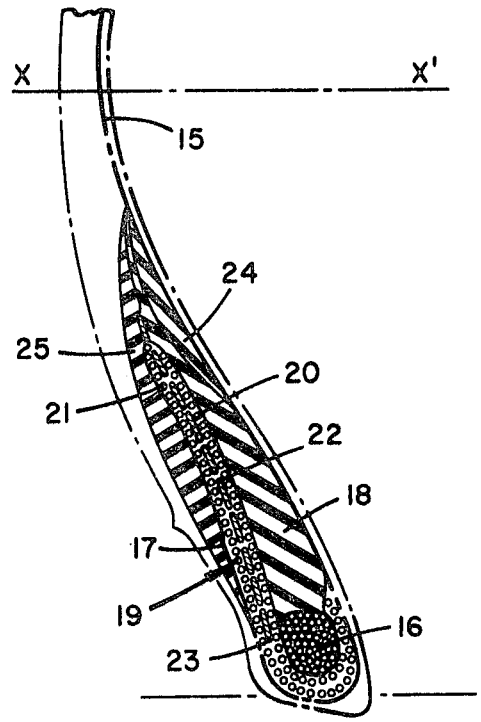
FIG. 4 represents the sidewall of the tire shown in FIG. 3 in cross section.

FIGS. 3 and 4 represent an alternative embodiment of the present invention; they show the sidewall of a radial tire, whose carcass 15 is constituted by a single ply of nylon cords lying in radial planes, which are turned up about the bead core 16 by passing from the inside towards the outside. The turn-ups 17 extend as far as the bead zone, as in the tire represented in FIGS. 1 and 2.

On the bead core 16 there is a filler 18 of a compound having a hardness of 90° Shore, which extends in the sidewall portion as far as a height equal to 45 percent of the height H of the tire section.

The thickness of the filler 18 is gradually reduced by passing from the bead to the sidewall.

Between the filler 18 and the turn-ups 17 of the carcass, provision is made for a reinforcing structure 19, constituted by two strips 20 and 21 of rayon cords, between which is sandwiched a strip 22 of metal cords.

The rayon cords of strips 20 and 21 are inclined in the same direction with respect to the circumferential lines of the tire parallel to the bead core 16, and form an angle of 22° with them, while the metal cords of strip 22 arre inclined in an opposite direction with respect to said rayon cords, in order to cross them, and form with said circumferential lines an angle of 25°.

The metal cords of strip 22 have a 1 × 4/0.22 formation, namely are formed by one strand constituted by four wires, each of which has a diameter of 0.22 mm.; the rayon cords of strips 20 and 21 have a 2440/3 count, while the nylon cords of the carcass have a 1400/3 count.

At the radially innermost portion of the reinforcing structure 19, strips 20 and 21 are turned up about the bead core, by passing from the outside towards the inside, and stop in the bead zone; on the contrary, the radially innermost skirting 23 of strip 22 of metal cords is not turned up about the bead core 16, but terminates at the height of the latter.

At the radially outermost portion of the reinforcing structure 19, the strip 22 of metal cords extends in the sidewall zone as far as a height equal to 35 percent of the height H of the tire section, while strips 20 and 21 reach a radial height respectively lower by 7 and 4 mm. than that of strip 22.

At the radially outermost portion of the reinforcing structure 19, in a position axially comprised between the carcass 15 and the filler 18, there is a rubber strip 24 having a hardness of 60° Shore; said strip is positioned in such a way that the midline of its cross section corresponds to the radially outermost height of strip 22 of metal cords; the section of strip 24 has a length of 30 mm.

At last, in an axially outer position with respect to the turn-up 17 of the carcass, there is a strip 25 of hard rubber, which extends from the bead base towards the sidewall as far as the height reached by the filler 18, so as to provide the necessary graduality between the stiffness of the lower portion of the sidewall and the upper portion of same.

The details of construction of the invention can be varied as necessary, it being of course understood that the present invention includes any other alternative embodiments deriving from the above indicated inventive concept.

What is claimed is:

1. A pneumatic tire for vehicle wheels comprising
   two beads each containing a bead core,
   a carcass constituted by textile cords lying in radial planes or forming small angles with said planes, wherein said cords extend from one bead to the other of the tire and are turned up about the bead cores contained in said beads in a direction from the inner side toward the outer side of the tire,
   each bead comprising
   a filler of hard rubber arranged on the bead core and extending toward the lower zone of the sidewall of said tire,
   the bead zone and the lower sidewall zone comprising a reinforcing structure which is disposed in an axially outer position with respect to said carcass, said reinforcing structure comprising
   at least two strips of textile cords having a strip of metal cords sandwiched therebetween,
   said textile cords being parallel to one another and inclined in a single direction with respect to the circumferential lines of said tire,
   said metal cords also being parallel to one another and inclined in a direction opposite to that of said textile cords,
   the angle formed by said textile cords with the circumferential lines of said tire ranging from 15° to 40°,
   the angle formed by said metal cords with the circumferential lines of said tire being greater than the angle formed by said textile cords with the circumferential lines of said tire and
   the difference between the values of said angles ranging between 2° and 10°.

2. The pneumatic tire of claim 1 wherein said reinforcing structure extends in the lower portion of the sidewall up to a height defined between 25 and 45 percent of the tire section height, said strip of metal cords extends to a radially outermost portion with respect to said strips of textile cords, for a length which does not exceed 30 mm.

3. The pneumatic tire of claim 1 wherein at least the radially outermost portion of said reinforcing structure is axially inserted between two hard rubber structural shapes, with structural shapes extending to a radially outermost portion with respect to said structure, for a length ranging between 3 and 30 mm.

4. The pneumatic tire of claim 3 wherein a strip of low hardness rubber is inserted at the radially outermost portion of said reinforcing structure between the axially innermost hard rubber structural shape and said carcass, the cross section of said strip having a length between 15 and 50 mm and the midline thereof being positioned at the height of the radially outermost portion of said reinforcing structure.

5. The pneumatic tire of claim 4 wherein said reinforced structure is axially positioned between said carcass and the hard rubber filler situated on the bead cores, the strips of textile cords of said structure being turned up about said bead cores from the inside toward the outside and continuing their travel toward the lower portion of the sidewall to a height radially comprised between the turn-ups of said carcass and the radially outermost ends of said reinforcing structure and wherein the strip of metal cords is not turned up about said bead cores but terminates at the height of the latter.

6. The pneumatic tire of claim 4 wherein said reinforcing structure is positioned axially between the hard rubber filler situated on said bead cores and the turn-ups of said carcass, the strips of textile cords of said structure are turned up about the bead cores from the outside toward the inside and terminate in the bead zone and wherein said strip of metal cords is not turned up about said bead cores but terminates at the height of the latter.

7. The pneumatic tire of claim 5 wherein a hard rubber strip is situated in an axially outermost position and extends from the bead base to a height radially outermost from said reinforcing structure.

8. The pneumatic tire of claim 6 wherein a hard rubber strip is situated in an axially outermost position and extends from the bead base to a height radially outermost from said reinforcing structure.

* * * * *

UNITED STATES PATENT OFFICE
CERTIFICATE OF CORRECTION

Patent No. 3,736,973    Dated June 5, 1973

Inventor(s) MARIO MEZZANOTTE, ET AL.

It is certified that error appears in the above-identified patent and that said Letters Patent are hereby corrected as shown below:

On the cover sheet [73], "Industries Pirelli" should read -- Industrie Pirelli -- . Column 2, line 35, "thee" should read -- the -- . Column 3, lines 29 and 30, "suddent" should read -- sudden -- .

Signed and sealed this 22nd day of January 1974.

(SEAL)
Attest:

EDWARD M. FLETCHER, JR.  
Attesting Officer

RENE D. TEGTMEYER  
Acting Commissioner of Patents